Dec. 23, 1952 P. A. WILLIAMS 2,622,279
METHOD FOR FORMING CHANNELS IN THERMOPLASTIC MATERIALS
Original Filed March 17, 1949
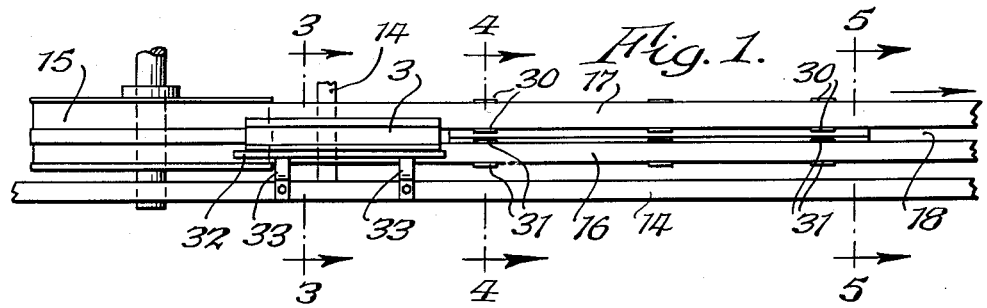
Fig. 1.
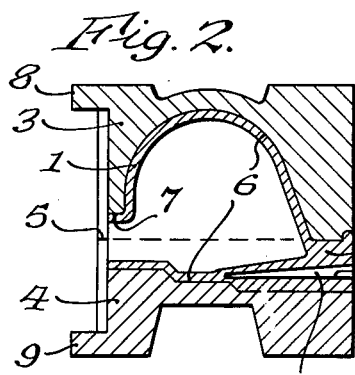
Fig. 2.
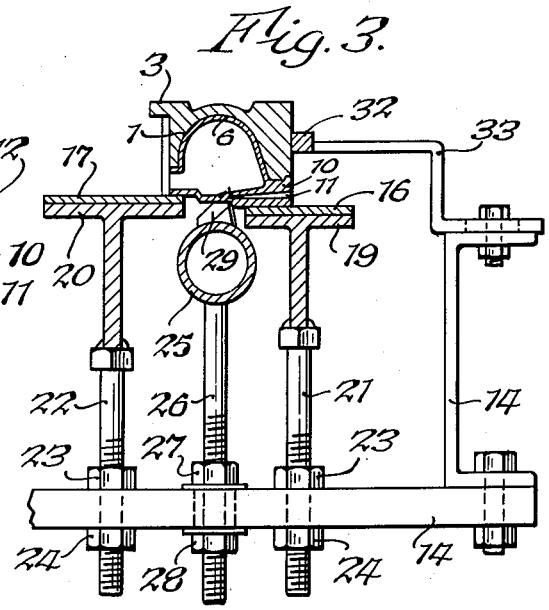
Fig. 3.
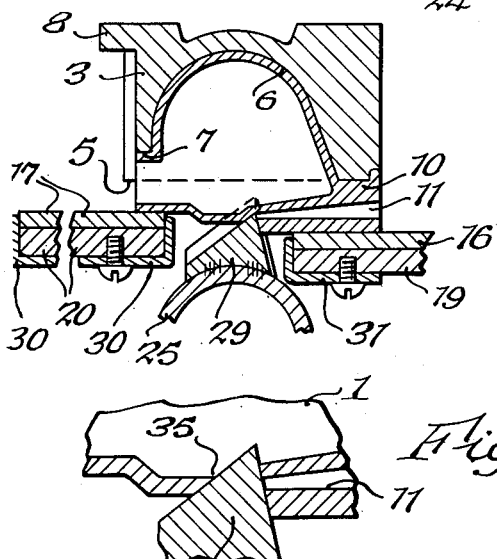
Fig. 4.
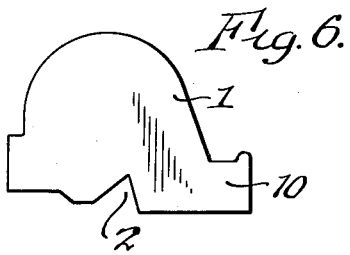
Fig. 5.
Fig. 6.
INVENTOR.
Paul A. Williams,
BY Parker, Prochnow & Farmer,
Attorneys.

Patented Dec. 23, 1952

2,622,279

UNITED STATES PATENT OFFICE 2,622,279

METHOD FOR FORMING CHANNELS IN THERMOPLASTIC MATERIALS

Paul A. Williams, West Seneca, N. Y., assignor to Glenn Confections, Inc., Buffalo, N. Y.

Original application March 17, 1949, Serial No. 81,894. Divided and this application April 25, 1951, Serial No. 229,424

7 Claims. (Cl. 18—47.5)

1

This invention relates to the formation of channels or grooves in the surfaces of objects formed of thermo-plastic materials. More particularly the invention relates to the manufacture of whistles of thermo-plastic materials, such as of wax, paraffin or wax or paraffin-containing materials. Such whistles are commonly made by flush molding and are hollow.

This application is a division of my copending application Serial No. 81,894, filed March 17, 1949, now U. S. Patent No. 2,582,368.

An object of the invention is to provide an improved method for forming channels in the surfaces of hollow articles of thermo-plastic materials, by which the channels may be formed more or less automatically and uniformly without imposing forces on the materials which might tend to tear or fracture them, or leave burred edges.

Another object of the invention is to provide an improved method for making hollow whistles or similar objects of thermo-plastic materials; with which the whistle vent openings may be uniformly formed without danger of tearing the relatively thin walls of the whistle shell, and without clogging any of the chambers or passages; and which will provide smooth and accurately formed edges at the whistle vent opening, sufficiently accurate to give uniform sounds when the whistle is blown.

A further object of the invention is to provide improved methods for accomplishing the above object and which will be somewhat automatic, rapid and inexpensive.

Other objects and advantages will be apparent from the following description of one embodiment of the invention, and the novel features will be particularly pointed out hereinafter in connection with the appended claims.

In the accompanying drawing:

Fig. 1 is a plan of a portion of apparatus constructed in accordance with this invention for forming the channel in whistles or other objects of thermo-plastic materials;

Fig. 2 is a transverse, sectional elevation through a mold in which hollow whistles are formed by flush molding, before the whistle vent openings are formed, and before the whistles are removed from the mold;

Fig. 3 is a transverse, sectional elevation through the apparatus shown in Fig. 1, the section being taken approximately along the line 3—3 of Fig. 1;

Fig. 4 is another sectional elevation through the same, the section being taken approximately along the line 4—4 of Fig. 1;

Fig. 5 is a similar transverse sectional elevation through a portion of the same, the section being taken approximately along the line 5—5 of Fig. 1 after the whistle has reached the portion of the apparatus at the section line 5—5; and Fig. 6 is a side elevation of a flush molded whistle with a whistle vent formed in this manner.

In the illustrated embodiment of the invention, a hollow whistle 1 of suitable thermo-plastic materials or waxes is shown in side elevation in Fig. 6 in completed form. These whistles are first molded without the whistle vent opening 2, in a mold of the type shown in Fig. 2. Referring to Fig. 2, the mold is formed of complemental mold sections 3 and 4 which abut face to face along a parting line 5, and there are a plurality of mold cavities 6 arranged side by side but slightly spaced apart in a row along the mold formed of the sections 3 and 4.

These mold sections have between them at the parting line, an opening 7 leading to each chamber in which a whistle is to be formed through which molding wax in fluid condition may be introduced and excess removed as usual in flush molding, and flanges 8 and 9 extend along the sides of the mold at the face having opening 7, so that when the mold as shown in Fig. 2 is rotated clockwise a quarter revolution to bring the opening 7 uppermost, one may pour wax or other thermo-plastic material into the mold, and the flanges 8 and 9 act like a funnel to prevent spreading of the fluid wax. The heated wax congeals where it contacts the metal walls of the mold that define the whistle chamber. After the wax or thermo-plastic material has congealed, by cooling, to the desired thickness, the mold is inverted so that the uncongealed waxes or molding material may drain out, leaving the hollow shell that forms the whistle body. The mold sections 3 and 4 may then be separated, and since the larger part of the cavity is within the section 3, the molded shells will remain in the section 3, with the part thereof which was formerly in the molded section 4 projecting from the section 3. These whistle shells have a stem 10 extending therefrom, which serves as a mouth piece, and this stem is provided with an air passage 11, see Fig. 2, from end to end.

To form this air passage, a plate 12 extends along and overlies the mold sections 3 and 4, as shown in Fig. 2, and tongues 13 extend therefrom into the mold chambers, one for each chamber, at the opening that molds the mouth piece. These tongues 13 are tapered toward their free ends so that after the wax or molding materials have congealed around them and the excess uncongealed molding material has been drained out, the plate 12 may be removed with its attached tongues 13 leaving the passages 11. It will be observed from Fig. 2 that since the free ends of the tongues 13 project into the space of the molding chamber, the wax or molding material will congeal around the free ends, and as a result the inner ends of these air passages 11 will be closed. These closed ends of the air passages 11 are opened when the whistle sound openings are formed in accordance with this invention.

Referring next to Figs. 1, 3 and 4, I provide a frame 14 and in this frame I mount a pair of pulleys 15 (only one being shown), which are spaced apart along the frame. A pair of endless belts 16 and 17 pass around the pulleys 15 and are arranged side by side and spaced apart on the pulleys so as to provide a gap or space 18 between them. The upper runs or stretches of these belts 16 and 17 are generally horizontal and extend side by side, but spaced apart, and travel at the same speed in the same direction. A rail 19 is disposed between the upper stretch of the belt 16, and this run or stretch rides on the horizontal, upper face or surface of the rail 19 and is supported thereby from sagging. A similar rail 20 slidingly supports the upper stretch of the belt 17 and prevents it from sagging.

The rails 19 and 20 are supported respectively on studs 21 and 22 which pass through the frame 14 and are held in vertically adjusted positions by nuts 23 and 24, which are threaded on the studs 21 and 22 and engage opposite faces of the frame 14, as shown in Fig. 3. Thus, these rails 19 and 20 may be separately adjusted vertically to different heights and, consequently the heights of the belts 16 and 17 in the upper runs or stretches may be determined. Inasmuch as the stem or mouth piece part of each molded whistle projects from mold sections a lot farther than the opposite side, the belt 17 in its upper stretch is raised to a higher elevation, by its rail 20, than the belt 16, and this difference in levels of the belt stretches 16 and 17 is maintained for a substantial distance.

Disposed between the rails 19 and 20 is a steam pipe 25 which is supported on studs 26 that depend therefrom and pass through apertures in the frame 14 and are held at different adjusted positions in the frame 14 by nuts 27 and 28 that are threaded on the stud 26 and engage opposite faces of the frame 14. This pipe 25 is connected at one end to a source of steam, not shown, so that this pipe 25 will be heated, although other means of heating it, such as by an electric resistance, may be employed if desired. This pipe 25 is disposed approximately horizontally between the rails 19 and 20, so as to extend in the direction of travel of the belts.

Welded or otherwise secured on the pipe 25 is a fin or rib 29 which has an upwardly tapered, sharp edge, something like an inverted V in shape. This rib 29 runs lengthwise of the pipe 25 and is progressively higher towards one end, that is, it increases in height from the pipe 25 progressively in the direction of travel of the upper stretches of the belts 16 and 17. This rib or element 29 rises to progressively greater extents through the space between the belts in the direction of travel of the belts, for a purpose which will appear presently.

The rails 19 and 20 have upstanding, marginal guides or flanges 30 and 31, disposed at intervals therealong, Fig. 4 which extend short distances along the sides of the belts resting on the rails, and prevent sidewise movements of the belts while on the rails. The frame 14 also has a guide arm 32 supported therefrom by arm 33. Arm 32 extends parallel to and above the rail 19, so as to serve as a placement guide for the mold section 3, as will be explained presently.

After a plurality of hollow whistles have been formed in the mold sections 3 and 4, as shown in Fig. 2, the plate 12 is first removed with its tongues 13, and then the mold section 4 is removed or separated, which leaves the hollow molded whistle shells extending somewhat from the sections 3, as shown in Fig. 4. The section 3 is then disposed, inverted, over the belts 16 and 17 with a side of the mold section 3 abutting against the guide rail 32, as shown in Fig. 3, and with the whistle shells resting on the belts 16 and 17, also shown in Fig. 3. The mold section 3 keeps the whistle shells properly positioned and spaced, and as it and the whistle shells are carried along by the belts 16 and 17, the lower end of the tapered apex or edge of the heated rib 29 will first engage with the whistle shells, because the rib gradually rises through the gap between the belts in the direction of travel of the belts.

As the whistle shells are carried along they will meet and engage with this heated rib 29. The movement is relatively slow, so that the rib may melt away the wax or molding material of the whistle shells with which it engages, and as the wax or molded material is melted by the heated rib 29, it drains away down the sides of the rib 29. The rib 29 will thus relatively rise into the moving whistle body and melt away an opening therein, as shown in Fig. 5, and in doing so, it forms the V-shaped whistle vent opening 2 in the molded whistle shell that opens into the chamber of the hollow whistle shell and also opens the inner end of the air passage 11. It also forms a sharp edge or corner 35 in the whistle shell, in proper position relatively to the air passage 11, so that an air column moving along the passage 11 into the whistle body will be set into vibration after it strikes the edge 35, as is well known in whistles. After the whistle shells have moved past the rib 29, the mold section 3 may be lifted and then the whistle shells removed from the mold section 3. They are then ready for use.

It will be observed that since the channels 2 are formed in the molded bodies in their lower faces, the melted wax or molding material will drain away and not plug the air passage 11. If one cuts the whistle opening with a cutter, it may leave on the cut edge a fuzzy or burr edge at the end of the air passage, that spoils the whistle effect by causing improper and undesired eddy currents in the air column or stream. When the whistle vent opening is formed by melting, it gives a clean edge, free of burrs or fuzzy edges. Since the molded shell is above the heated rib that melts the channel therein, the wax which is melted will drain down the sides of the heated rib, because the heated rib keeps the wax that is in contact with it fluid, instead of forming ribs along the melted channel.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. The method of making whistles of molding wax which comprises first flush molding a hollow whistle body of said wax with a stem and an air passage in the stem, and then melting out a whistle vent opening in a wall of said body to intersect and open the inner end of said air passage.

2. The method of making whistles of molding wax which comprises first flush molding of said wax, a hollow whistle shell with an air chamber, a stem, and an air passage in said stem leading from its outer end nearly to but short of intersection with said chamber, and then melting a whistle vent opening into said shell to intersect said chamber and the inner end of said air passage.

3. The method of making whistles of molding wax which comprises first flush molding of said wax, a hollow whistle shell with an air chamber, a stem, and an air passage in said stem leading from its outer end nearly to but short of intersection with said chamber, and then slowly inserting a heated wedge-shaped element into said shell to intersect said chamber and the inner end of said air passage to form a whistle vent.

4. A method of making whistles of molding wax which comprises first flush molding, of said wax, a hollow whistle shell with an air chamber, a stem, and an air passage in said stem leading from the outer end of the stem nearly to but short of intersection with said chamber, then holding the shell with that face in which a whistle vent is to be provided downwardly, and slowly melting a whistle vent upwardly into said shell to intersect said chamber and cross the inner end of said air passage.

5. The method of making whistles of molding wax which comprises first molding, of said wax, a hollow whistle shell with an air chamber, a stem, and an air passage in said stem leading from the outer end of the stem nearly to but short of intersection with said chamber, then holding the shell with the face in which a whistle vent is to be provided downwardly, causing relative movement of said shell lengthwise along, and with its said face in contact with the top of a heated rod with an upstanding tapered edge, and progressively causing relative approach of said tapered edge and said face during said relative movement to slowly melt a whistle vent opening in said face intersecting said chamber and said air passage.

6. The method of converting molding wax into whistles of the type having a hollow wax shell with an air chamber, a stem, an air passage in said stem leading from the outer end of said stem to said chamber, and an air vent opening into said chamber, in close proximity to the inner end of said air passage, which comprises first flush molding said wax into a hollow shell, in a sectional mold body, with a cavity corresponding to the outside dimensions of said whistle and having a removable core corresponding in size, shape and position to said air passage, and also having a removable wall for said cavity and covering that face of said molded shell in which the air vent is to be formed, and, while said molded hollow shell remains in the remainder of the mold body, first removing said core and said removable wall to form said air passage and expose the face area of that wall of said molded shell in which said air vent is desired, and then moving a heated tool into said exposed face area of said exposed shell wall, and against the shell wall closing the inner end of said air passage, to melt said air vent into the molded shell and melt off the wall closing the inner end of said air passage so as to open that passage into the air chamber in said shell.

7. The method of converting molding wax into whistles of the type having a hollow wax shell with an air chamber, a stem, an air passage in said stem leading from the outer end of said stem to said chamber, and an air vent opening into said chamber in close proximity to the inner end of said air passage, which comprises first flush molding said wax into a hollow shell, in a sectional mold body, with a cavity corresponding to the outside dimensions of said whistle and having a removable core coresponding in size, shape and position to said air passage, and also having a removable wall for said cavity and covering that face of said molded shell in which the air vent is to be formed, and, while said molded hollow shell remains in the remainder of the mold body, first removing said core and said removable wall to form said air passage and expose the face area of that wall of said molded shell in which said air vent is desired, and then moving a heated tool laterally across and through said exposed shell wall, into said chamber to melt said vent opening into said exposed shell wall, and also across the wall defining the air passage within said air chamber to open the inner end of said passage approximately at the vent opening.

PAUL A. WILLIAMS.

REFERENCES CITED

The following references are of record in the file of this patent:

UNITED STATES PATENTS

| Number | Name | Date |
|---|---|---|
| 229,163 | Mills | June 22, 1880 |
| 1,049,701 | Goonley | Jan. 7, 1913 |
| 2,107,981 | Ford | Feb. 8, 1938 |
| 2,485,769 | Phelps | Oct. 25, 1949 |